US012679164B1

(12) United States Patent
Seo et al.

(10) Patent No.: US 12,679,164 B1
(45) Date of Patent: Jul. 14, 2026

(54) STABILIZER BAR ASSEMBLY WITH VARIABLE ROLL STIFFNESS

(71) Applicant: DAEWON KANG UP CO., LTD., Cheonan-si (KR)

(72) Inventors: Yu Won Seo, Anyang-si (KR); Won Yeong Kim, Incheon (KR); Ki Yong Kim, Anyang-si (KR)

(73) Assignee: DAEWON KANG UP CO., LTD., Cheonan-si (KR)

( * ) Notice: Subject to any disclaimer, the term of this patent is extended or adjusted under 35 U.S.C. 154(b) by 0 days.

(21) Appl. No.: 19/262,548

(22) Filed: Jul. 8, 2025

(51) Int. Cl.
B60G 21/055 (2006.01)

(52) U.S. Cl.
CPC .............................. B60G 21/0558 (2013.01)

(58) Field of Classification Search
CPC ............................ B60G 21/055; B60G 17/025;
B60G 21/0556; B60G 17/016; B60G
2204/41; B60G 2500/22; B60G 2204/62;
B60G 2204/1222; B60G 2206/427; B60G
2600/20; B60G 2202/43; B60G 2204/42;
B60G 2202/135; B60G 2600/206; F16D
23/12; F16D 11/00; F16D 2023/123
See application file for complete search history.

(56) References Cited

U.S. PATENT DOCUMENTS

| | | | | | |
|---|---|---|---|---|---|
| 6,481,732 | B1 * | 11/2002 | Hawkins | ............ | B60G 17/0162 |
| | | | | | 280/124.106 |
| 6,513,819 | B1 * | 2/2003 | Oliver | ................ | B60G 21/0553 |
| | | | | | 280/124.152 |
| 7,207,574 | B2 * | 4/2007 | Gradu | ................ | B60G 21/0558 |
| | | | | | 280/5.511 |
| 7,309,074 | B2 * | 12/2007 | Taneda | ................ | B60G 17/019 |
| | | | | | 280/124.106 |

(Continued)

FOREIGN PATENT DOCUMENTS

| | | |
|---|---|---|
| JP | 2006-193013 A | 7/2006 |
| KR | 10-2015-0012854 A | 2/2015 |

(Continued)

OTHER PUBLICATIONS

Office action from KR10-2023-0153309 and Machine Tranlation thereof. Feb. 21, 2025.

*Primary Examiner* — Toan C To
(74) *Attorney, Agent, or Firm* — FisherBroyles, LLP; Craig W. Mueller

(57) ABSTRACT

The present disclosure relates to a stabilizer bar assembly with variable roll stiffness operating such that lower stiffness acts during straight driving and higher stiffness acts during cornering. The assembly includes an outer housing secured to a first stabilizer bar to rotate together and having a hollow space inside, an inner housing secured to a second stabilizer bar to rotate together and inserted into the outer housing to rotate relative thereto, and an elastic member having one end (Continued)

secured to the outer housing and the other end secured to the inner housing to apply an elastic force to return the outer housing and the inner housing to their original positions during relative rotation. In this configuration, lower stiffness by an elastic force of an elastic member acts during straight driving to enhance ride comfort during straight driving, and higher stiffness by a stabilizer bar acts during cornering to improve driving stability.

8 Claims, 9 Drawing Sheets

(56)                    References Cited

U.S. PATENT DOCUMENTS

| 7,725,226 | B2 * | 5/2010 | Urababa | B60G 21/0555 |
| | | | | 280/5.506 |
| 7,837,202 | B2 * | 11/2010 | Taneda | B60G 21/0556 |
| | | | | 280/124.152 |
| 7,909,339 | B2 * | 3/2011 | Pinkos | B60G 3/20 |
| | | | | 280/124.152 |
| 8,690,175 | B2 * | 4/2014 | Brown | B60G 21/0556 |
| | | | | 280/5.509 |
| 9,944,148 | B2 * | 4/2018 | Villegas Muriel | |
| | | | | B60G 21/0551 |
| 10,118,457 | B2 * | 11/2018 | Yang | B60G 21/055 |
| 10,940,736 | B2 * | 3/2021 | Romelhardt | B60G 17/0152 |
| 11,858,306 | B2 * | 1/2024 | Kraus | B60G 21/0556 |
| 12,179,533 | B1 * | 12/2024 | Kim | F16F 1/145 |
| 12,454,163 | B2 * | 10/2025 | Bailey | B60B 35/14 |
| 2004/0217568 | A1 * | 11/2004 | Gradu | F16F 9/53 |
| | | | | 280/124.107 |
| 2005/0110228 | A1 * | 5/2005 | Fujimori | B60G 17/025 |
| | | | | 280/5.511 |
| 2006/0273539 | A1 * | 12/2006 | Barth | B60G 21/0558 |
| | | | | 280/5.511 |
| 2018/0086172 | A1 * | 3/2018 | Breton | F16H 55/18 |
| 2020/0376919 | A1 * | 12/2020 | Lim | B60G 21/055 |
| 2021/0270343 | A1 * | 9/2021 | Battlogg | F16F 9/145 |

FOREIGN PATENT DOCUMENTS

| KR | 10-2021-0157075 | A | | 12/2021 | |
| KR | 10-2362991 | B1 | | 2/2022 | |
| KR | 10-2023-0153309 | | | 5/2025 | |
| KR | 10-2025-0067317 | A | | 5/2025 | |
| KR | 20250152230 | A | * | 10/2025 | B60G 21/0553 |

* cited by examiner

STABILIZER BAR ASSEMBLY WITH VARIABLE ROLL STIFFNESS

BACKGROUND OF THE INVENTION

Field of the Invention

The present disclosure relates to a stabilizer bar assembly with variable roll stiffness, and more particularly a stabilizer bar assembly with variable roll stiffness capable of adjusting the stiffness of the stabilizer bar in response to the driving conditions of the vehicle.

Description of the Related Art

In general, a stabilizer bar used in vehicles is structured to extend in the transverse direction of the vehicle body and is mounted in the lower part of the vehicle to connect the right and left wheels to each other.

In particular, the vehicle body experiences rolling during cornering due to lateral acceleration caused by the centrifugal force, and the stabilizer bar prevents outer wheels in the radial direction of the curved road from losing contact with the ground, thereby securing driving stability.

From the safety perspective, the stabilizer bar preferably has greater stiffness during cornering to prevent the vehicle from overturning due to rolling. However, the stabilizer bar preferably minimizes the transmission of the driving load to the vehicle body during straight driving to enhance ride comfort.

In other words, the stiffness of the stabilizer is preferably adjusted such that lower stiffness acts when the torsion angle is below a predetermined threshold, indicating straight driving, and higher stiffness acts when the torsion angle reaches a threshold and beyond.

Traditional stabilizer bars are typically manufactured by cutting a single round bar or pipe material to the required length, forming the cut material into a desired shape, and then undergoing processes such as heat treatment, shot peening, and coating.

Stabilizer bars made of a single material have the advantage of easy manufacturing and low production costs but also have the disadvantage that their inherent constant stiffness renders the stiffness control challenging.

On the other hand, active stabilizer bars divided into right and left parts with an actuator installed in between have been developed and used.

The actuator controls the torsion of the stabilizer bar by converting electrical energy into mechanical force using an electric motor, hydraulic motor, electromagnet, etc., and adjusts the stiffness of the stabilizer bar as it rotates the right and left stabilizer bars in directions opposite the torsion direction.

The active stabilizer bars have the advantage of enhancing the driving stability and ride comfort of the vehicle by adjusting the stiffness of the stabilizer bar properly depending on driving situations.

However, the complex structure of the active stabilizer bar poses a challenge in manufacturing, essential sensors and control devices drive up unit production costs, and further, the actuator's large volume makes it difficult to secure installation space in vehicles.

In addition, sudden changes in road conditions during driving require quick judgment on the road conditions to activate the actuator to adjust the stiffness of the stabilizer bar accordingly, but the instantaneous operation of the actuator is limited. In other words, response lag hinders practical vehicle application.

Document of Related Art (Patent Document 1) Korean Registered Patent 10-2362991 (Feb. 10, 2022)

SUMMARY OF THE INVENTION

An aspect of the present disclosure is directed to providing a stabilizer bar assembly with variable roll stiffness operating such that lower stiffness acts during straight driving and higher stiffness acts during cornering.

According to preferred embodiments of the present disclosure, a stabilizer bar assembly with variable roll stiffness includes an outer housing secured to a first stabilizer bar to rotate together and having a hollow space inside, an inner housing secured to a second stabilizer bar to rotate together and inserted into the outer housing to rotate relative thereto, and an elastic member having one end secured to the outer housing and the other end secured to the inner housing to apply an elastic force to return the outer housing and the inner housing to their original positions during relative rotation.

In this configuration, the stabilizer bar assembly may have a first stiffness interval in which the outer housing and the inner housing do not interfere with each other within a predetermined angular range and the elastic member acts, and a second stiffness interval in which the outer housing and the inner housing constrain each other beyond a predetermined angular range and the first stabilizer bar and the second stabilizer bar act.

To this end, the outer housing may include an outer housing body having a hollow space with one side open and the other side secured to the first stabilizer, an inner housing receptacle formed by depression on the open side of the outer housing body for the inner housing to be inserted thereinto, a first elastic member securing portion formed by depression on the inner side of the inner housing receptacle to fixedly secure one end of the elastic member, and a first support portion formed by protruding on the inner circumferential surface of the inner housing receptacle in the circumferential direction to selectively support the inner housing upon contact.

The inner housing may include an inner housing body having a hollow space with one side open and the other side secured to the second stabilizer bar, a second elastic member securing portion formed by depression on the inner side of the inner housing body to fixedly secure the other end of the elastic member, and a second support portion formed by protrusion on the outer circumferential surface of the inner housing body in the circumferential direction to selectively support the first support portion upon contact.

A plurality of first support portions and second support portions may be disposed alternately, not contact each other within a predetermined angular range, and contact each other beyond a predetermined angular range to rotate together.

The stabilizer bar assembly with variable roll stiffness of the present disclosure may further include an auxiliary elastic member protruding outward from the surface of the second support portion contacting the first support portion to apply an elastic force when in contact with the first support portion.

In this configuration, the elastic member may apply an elastic force when the outer housing and the inner housing rotate relative to each other, the auxiliary elastic member may apply an additional elastic force when the first support portion comes into contact with the auxiliary elastic member, and the first stabilizer bar and the second stabilizer bar may apply further elastic force when the first support portion comes into contact with the second support portion.

A buffer may be further included between the first support portion and the second support portion.

The buffer may include at least one of the viscous lubricant, elastomer, and plastic.

DETAILED DESCRIPTION OF THE INVENTION

Preferred embodiments of the present disclosure will be described in detail with reference to the accompanying drawings.

The present disclosure may be modified in various manners and may have several embodiments, and specific embodiments will be illustrated and described in detail. This is not intended to limit the present disclosure to specific embodiments and should be construed to include all modifications, equivalents, and substitutes that fall within the scope of ideas and techniques of the present disclosure.

The terms used in the present application are used only to describe specific embodiments and are not intended to limit the present disclosure. Singular expressions may include plural expressions unless the context expressly means otherwise.

Unless defined otherwise, all terms used herein, including technical or scientific terms, may carry the same meanings as generally understood by those skilled in the art to which the present disclosure pertains. Terms, as defined in commonly used dictionaries, may be interpreted as having meanings consistent with their contextual meanings in the related art and may not be interpreted in an idealistic or overly formal sense unless expressly defined in the present application.

Specific embodiments of the present disclosure will be described with reference to the accompanying drawings below.

Figure 1:
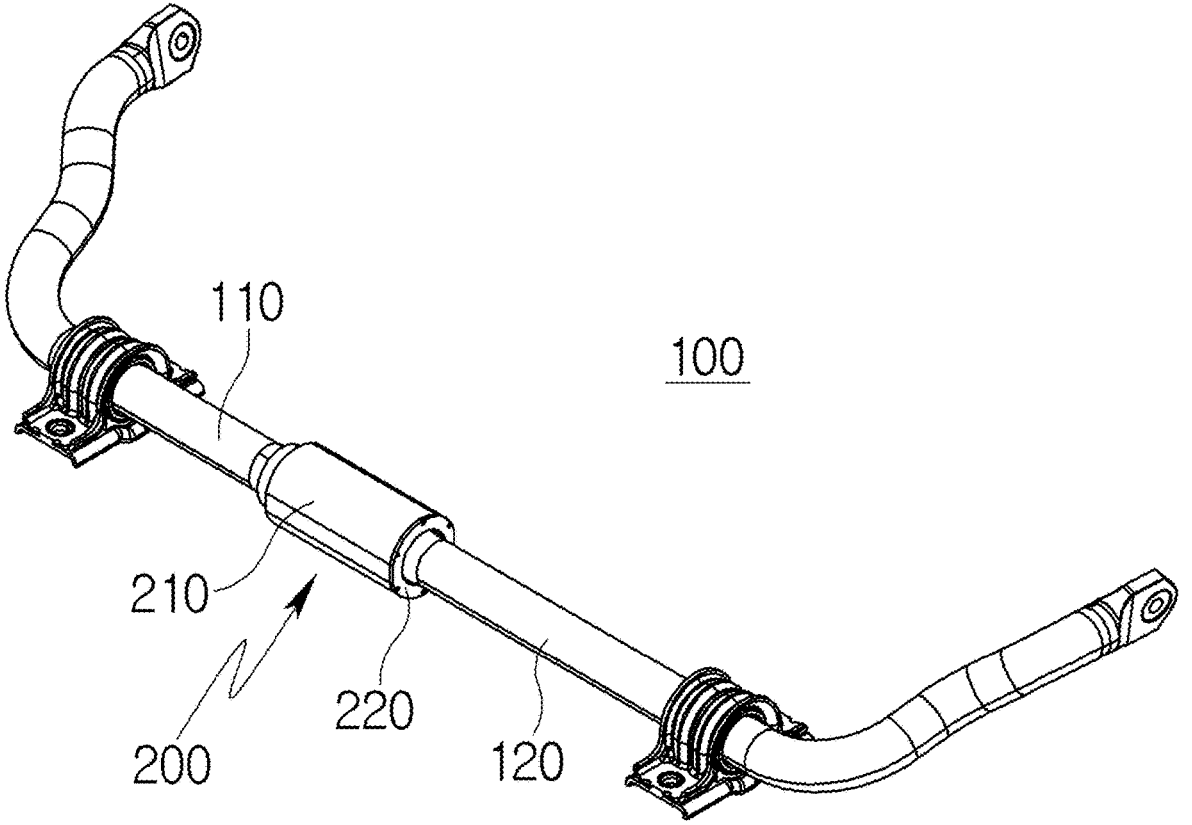
FIG. 1 is a perspective view schematically illustrating a stabilizer bar assembly with variable rolling stiffness according to an embodiment of the present disclosure.
Figure 2:
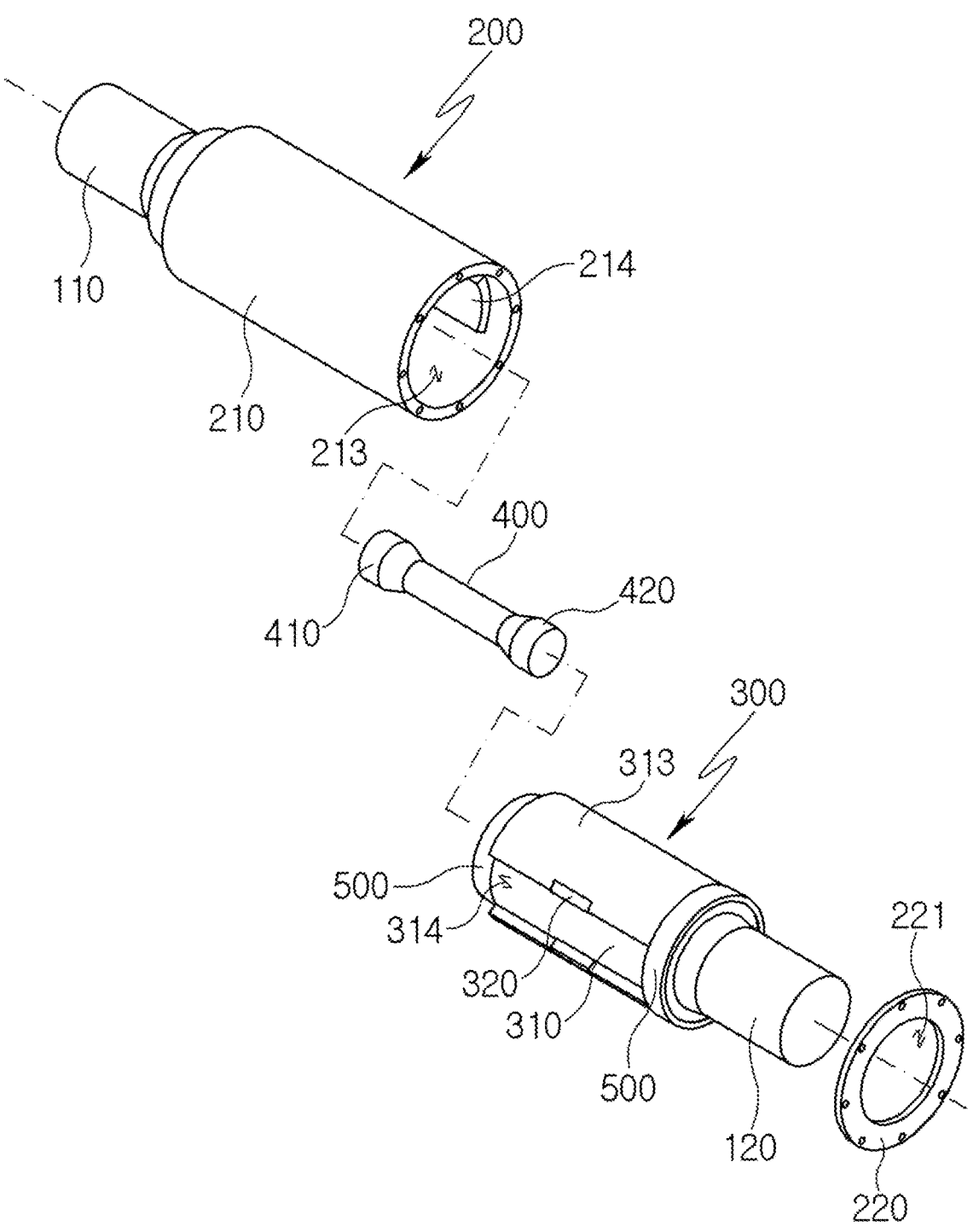
FIG. 2 is an exploded perspective view schematically illustrating a stabilizer bar assembly with variable rolling stiffness according to an embodiment of the present disclosure.
Figure 3:
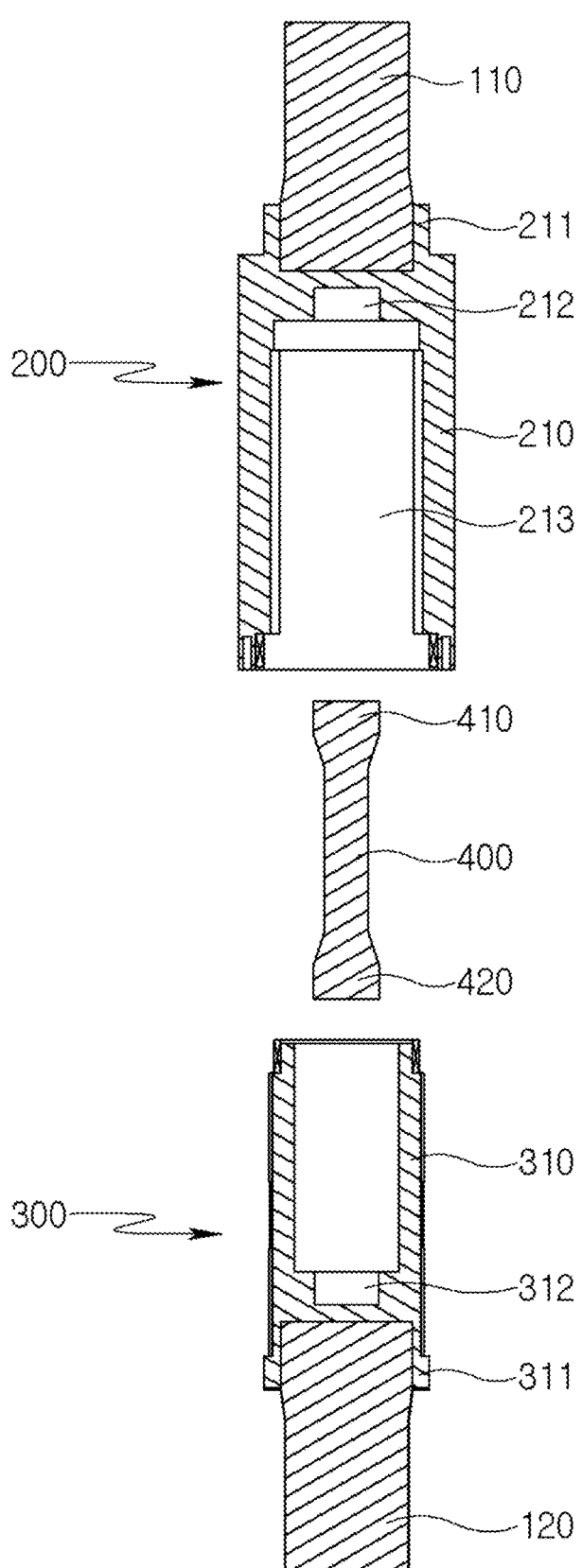
FIG. 3 is a longitudinal view schematically illustrating a stabilizer bar assembly with variable rolling stiffness according to an embodiment of the present disclosure.
Figure 4:
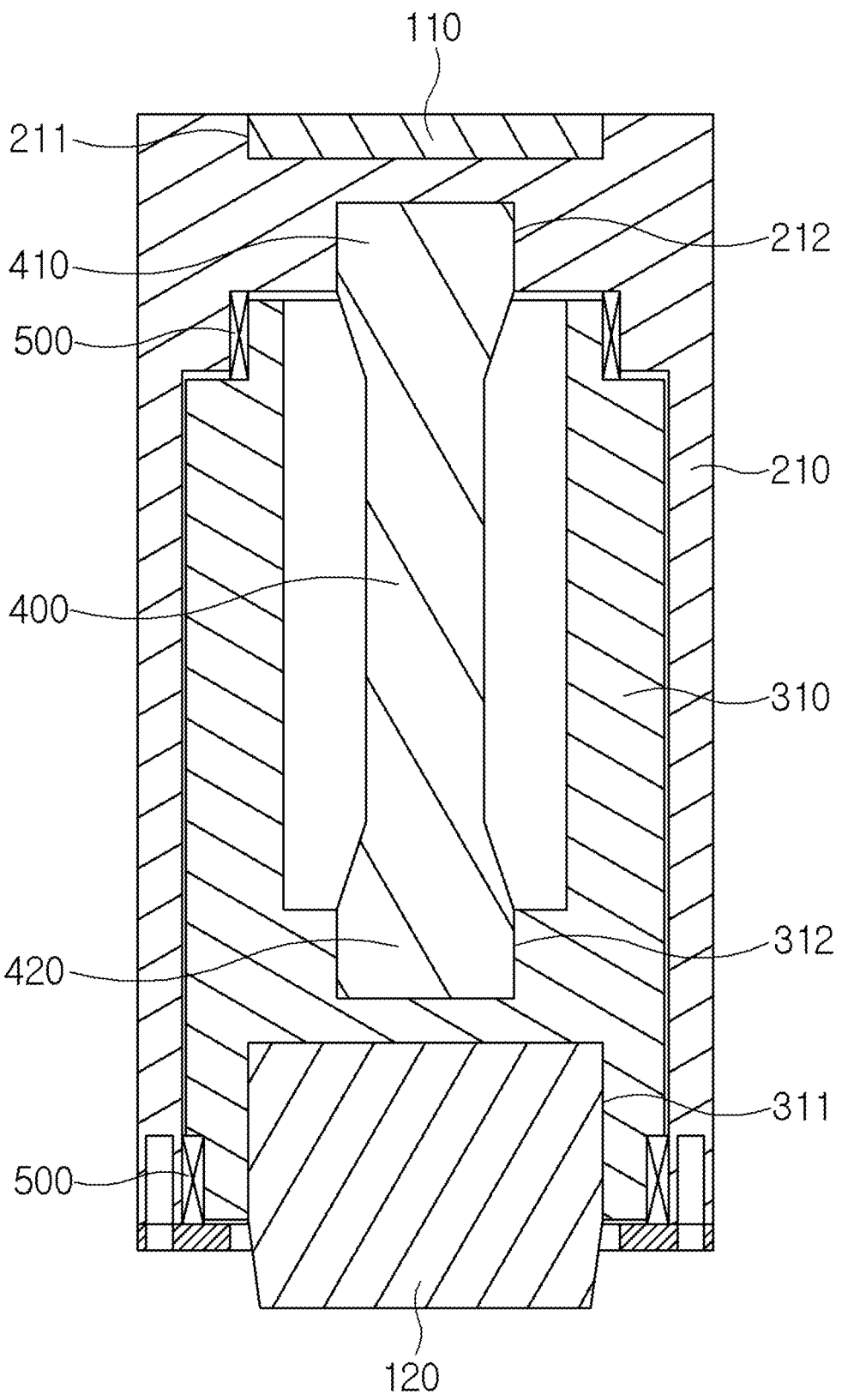
FIG. 4 is a longitudinal view schematically illustrating the main part of a stabilizer bar assembly with variable rolling stiffness according to an embodiment of the present disclosure.
Figure 5:
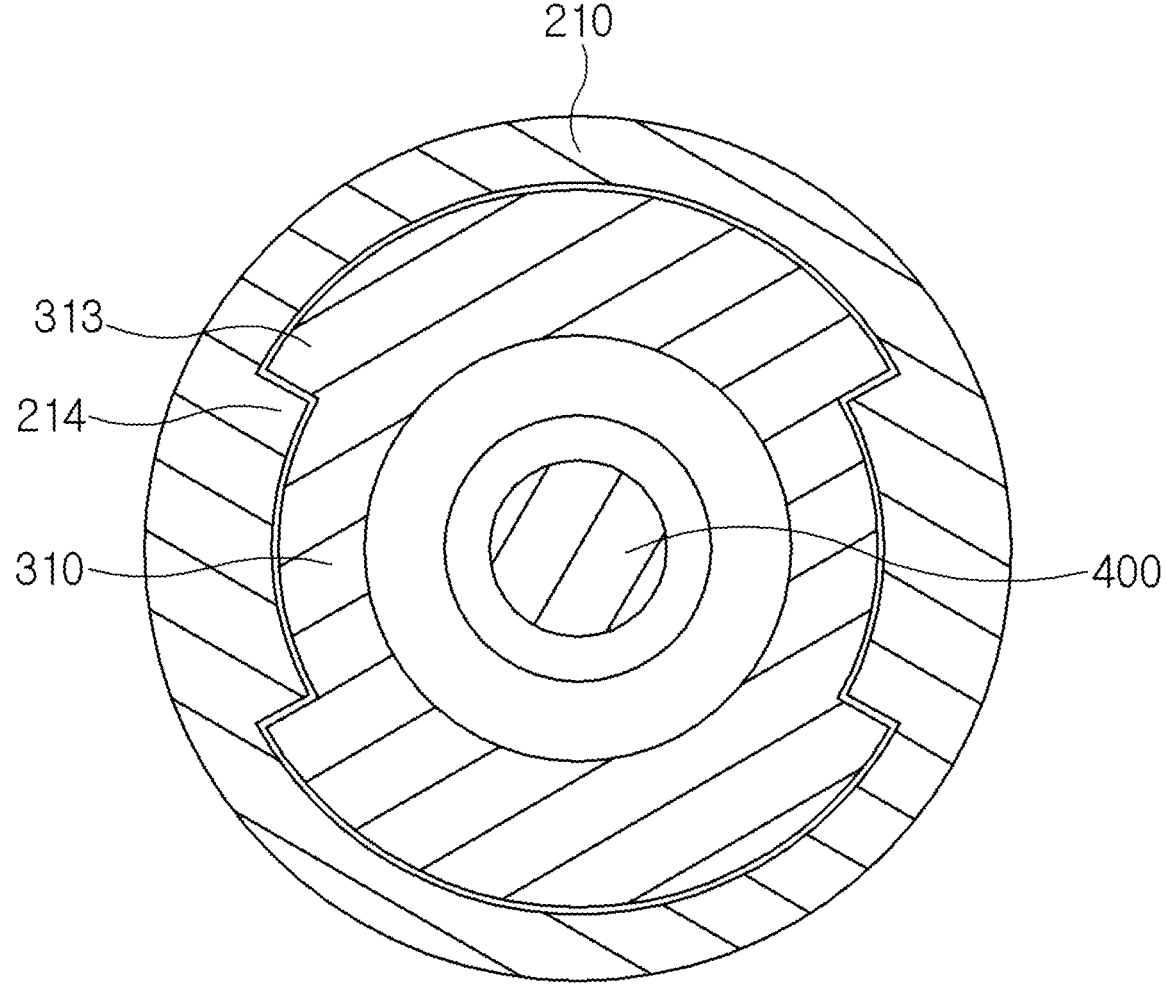
FIG. 5 is a cross-sectional view schematically illustrating a stabilizer bar assembly with variable rolling stiffness according to an embodiment of the present disclosure.
Figure 6:
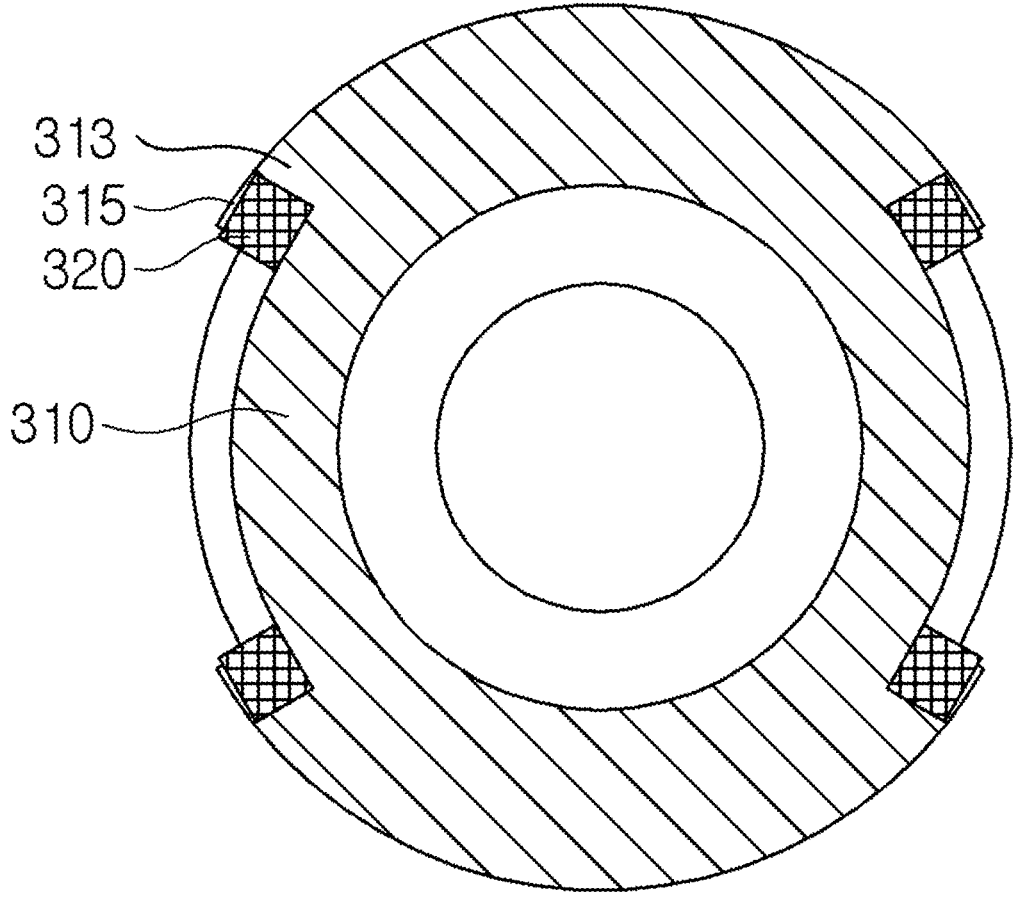
FIG. 6 is a cross-sectional view schematically illustrating an inner housing of a stabilizer bar assembly with variable rolling stiffness according to an embodiment of the present disclosure.

FIGS. 1 and 2 are a perspective view and an exploded perspective view schematically illustrating a stabilizer bar assembly with variable rolling stiffness according to an embodiment of the present disclosure: FIG. 3 is a longitudinal view schematically illustrating the stabilizer bar assembly with variable rolling stiffness: FIG. 4 is a longitudinal view schematically illustrating the main part of the stabilizer bar assembly with variable rolling stiffness: FIG. 5 is a cross-sectional view schematically illustrating a stabilizer bar assembly with variable rolling stiffness: FIG. 6 is a cross-sectional view schematically illustrating an inner housing of the stabilizer bar assembly with variable rolling stiffness.

FIGS. 1 to 6 show that a stabilizer bar assembly with variable roll stiffness 100 operates such that lower stiffness by an elastic force of an elastic member 400 acts during straight driving and higher stiffness by stabilizer bars 110, 120 acts during cornering, thereby enhancing ride comfort during straight driving and driving stability during cornering.

To this end, a pair of stabilizer bars 110, 120 are separately manufactured and the stabilizer bar connected to the left wheel and the stabilizer bar connected to the right wheel are engaged to rotate relative to each other. When rotating relative to each other within a predetermined angle, that is, in a straight driving interval, the pair of stabilizers rotate relative to each other, but the elastic force of the elastic member 400 acts. When rotating relative to each other beyond a predetermined angle, that is, in a cornering interval, the pair of stabilizers 110, 120 are interlocked with each other to rotate together in the same direction so that the stiffness of the stabilizer bars 110, 120 act to prevent the vehicle from rolling.

More specifically, according to the embodiments of the present disclosure, the stabilizer bar assembly with variable roll stiffness 100 includes an outer housing 200 secured to the first stabilizer bar 110 to rotate together and having a hollow space inside, an inner housing 300 secured to the second stabilizer bar 120 to rotate together and inserted into the outer housing 200 to rotate relative thereto, and an elastic member 400 having one end secured to the outer housing 200 and the other end secured to the inner housing 300 to apply an elastic force to return the outer housing 200 and the inner housing 300 to their original positions during relative rotation.

According to the embodiments of the present disclosure, in the stabilizer bar assembly with variable roll stiffness 100, the stabilizer bar divides into a first stabilizer bar 110 and a second stabilizer bar 120, wherein the first stabilizer bar 110 is secured to a wheel on one side of the vehicle and the outer housing 200 and the second stabilizer bar 120 is secured to a wheel on the other side of the vehicle and the inner housing 300, rotating relative to each other within a predetermined angular range.

Here, the interval in which the first stabilizer bar 110 and the second stabilizer bar 120 rotate relative to each other is a first stiffness interval in which the elastic force of the elastic member 400 applies and the stiffness is very low, and the interval in which the relative rotation is constrained by moving beyond a predetermined angular range is a second stiffness interval in which the first stabilizer bar 110 and the second stabilizer bar 120 constrain each other to rotate together and higher stiffness acts.

In other words, the outer housing 200 and the inner housing 300 do not interfere with each other within a predetermined angular range so that the elastic member 400 acts in the first stiffness interval, while the outer housing 200 and the inner housing 300 constrain each other to rotate together beyond a predetermined angular range so that the first stabilizer bar 110 and the second stabilizer bar 120 act in the second stiffness interval.

The outer housing 200 is secured to the first stabilizer bar 110 to rotate together and the inner housing 300 is inserted into the hollow space of the outer housing 200 to rotate relative thereto.

More specifically, the outer housing 200 includes an outer housing body 210 having a hollow space with one side open and the other side formed with a first stabilizer bar securing portion 211 secured to the first stabilizer bar 110, an inner housing receptacle 213 formed by depression on the open side of the outer housing body 210 for the inner housing 300 to be inserted thereinto, a first elastic member securing portion 212 formed by depression on the inner side of the inner housing receptacle 213 to fixedly secure one end 410 of the elastic member 400, and a first support portion 214 formed by protrusion on the inner circumferential surface of the inner housing receptacle 213 in the circumferential direction to selectively support the inner housing 300 upon contact.

A housing cover 220 installed on the open side of the outer housing 200 in the state where the inner housing 300 is installed in the outer housing 200 may be further provided.

The elastic member 400 is bar-shaped and applies an elastic force through torsional deformation when the outer housing 200 and the inner housing 300 rotate relative to each other. The elastic member 400 may be made of an elastically deformable metal or elastomer. In other words, the elastic member 400 may be made in a spring shape such as a torsion bar that applies an elastic force during torsional deformation.

The outer housing cover 220 is formed with a second stabilizer bar insertion hole 221 through its center such that the second stabilizer bar 120 secured to the inner housing 300 is inserted thereinto.

The inner housing 300 is secured to the second stabilizer bar 120 to rotate together and is inserted into the outer housing 200 to rotate relative thereto.

More specifically, the inner housing 300 includes an inner housing body 310 having a hollow space with one side open and the other side formed with a second stabilizer bar securing portion311 secured to the second stabilizer bar 120 and inserted into the outer housing 200 to rotate relative thereto, a second elastic member securing portion 312 formed by depression on the inner side of the inner housing body 310 to secure the other end 420 of the elastic member 400 fixedly, and a second support portion 313 formed by protrusion on the outer circumferential surface of the inner housing body 310 to selectively support the first support portion 214 upon contact.

A rotation support 500 may be provided between the outer housing 200 and the inner housing 300 to ensure that the outer housing 200 and the inner housing 300 may rotate relative to each other. The rotation support 500 may be made of bearings and be provided on both ends of the inner housing body 310.

A plurality of first support portions 214 and second support portions 313 radially extend along the rotational axis on the circumferential surface. In this case, the second support portions 313 are formed radially such that the first support portion receiving grooves 314 into which the first support portions 214 are inserted are formed between the plurality of second support portions 313. Here, the first support portion receiving grooves 314 are formed such that a gap is formed between the first support portion receiving grooves 314 and the first support portions 214.

As illustrated in FIG. 5, the first support portion 214 and the second support portion 313 are alternately disposed, do not contact each other within a predetermined angular range, and contact each other beyond a predetermined angular range to rotate together.

In this configuration, when the outer housing 200 and the inner housing 300 rotate in opposite directions, the elastic member 400 applies an elastic force through torsional deformation to form a first stiffness interval in the interval in which the first support portion 214 and the second support portion 313 do not contact each other.

When the outer housing 200 and the inner housing 300 rotate further and the first support portion 214 and the second support portion 313 come into contact, the relative rotation of the outer housing 200 and the inner housing 300 is constrained and the first stabilizer bar 110 and the second stabilizer bar 120 apply an elastic force through torsional deformation to form a second stiffness interval.

A sudden change in slope at the inflection point where the elastic torsional deformation region of the elastic member 400, which is the first stiffness interval, shifts to the elastic deformation region of the stabilizer bars 110, 120, which is the second stiffness interval, may cause a sense of jolt during driving.

In the present disclosure, the sense of jolt during driving may be prevented by further providing an auxiliary elastic member 320 and inducing a gradual increase of the inflection point in which the first stiffness interval transitions to the second stiffness interval.

To this end, as illustrated in FIG. 6, the auxiliary elastic member 320 is inserted into an auxiliary elastic member securing groove 315 formed on the surface of the second support portion 313 contacting the first support portion 214 and protrudes further outward than the second support portion 313 to apply an elastic force when the first support portion 214 comes into contact with the second support portion 313. The auxiliary elastic member 320 may be made of an elastic material, such as an elastomer pad, for example.

In this configuration, the elastic member 400 applies an elastic force to form the first stiffness interval when the outer housing 200 and the inner housing 300 rotate relative to each other, the auxiliary elastic member 320 is compressed to apply an additional elastic force and gradually increase the stiffness when the first support portion 214 comes into contact with the auxiliary elastic member 320, and the first stabilizer bar 110 and the second stabilizer bar 120 apply further elastic force to form the second stiffness interval when the first support portion 214 comes into contact with the second support portion 313

In other words, the auxiliary elastic member 320 induces a gradual increase of the inflection point in which the first stiffness interval transitions to the second stiffness interval.

Figure 7:
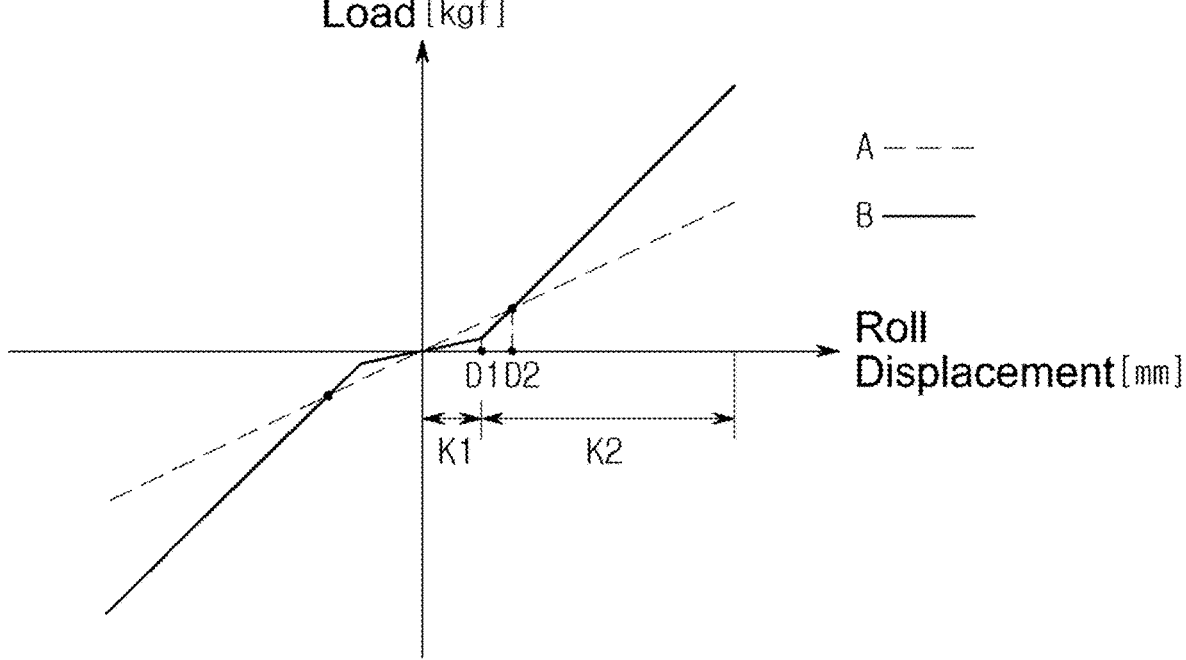
FIG. 7 is a graph comparing changes in the loads applied to the traditional stabilizer bar and a stabilizer bar assembly with variable roll stiffness according to an embodiment of the present disclosure based on roll displacement.

FIG. 7 is a graph comparing changes in the loads applied to the traditional stabilizer bar and a stabilizer bar assembly with variable roll stiffness according to an embodiment of the present disclosure based on roll displacement.

Here, roll displacement refers to the vertical displacement of one end of the stabilizer bar connected to the vehicle wheel, and applied load refers to the change in load applied to the stabilizer bar due to roll displacement.

As illustrated in FIG. 7, the traditional stabilizer bar A consists of one stabilizer bar having either end respectively connected to vehicle wheels so that load changes in proportion to roll displacement linearly.

In contrast, in the stabilizer bar assembly with variable roll stiffness B, stiffness is very low in the first stiffness interval K1 in which only the elastic force of the elastic member applies up until roll displacement reaches D1, and once roll displacement passes D1, higher stiffness acts in the second stiffness interval K2 in which the first stabilizer bar and the second stabilizer bar constrain each other to rotate together.

Here, when the first and second stabilizer bars of the present disclosure are made stiffer than the traditional stabilizer bar, roll displacement has a greater impact on the load of the stabilizer bar of the present discloser compared to the traditional stabilizer bar once roll displacement increases past D2 into the second stiffness interval K2 so that the applied loads are reversed.

Accordingly, when the roll displacement gets significant during sharp cornering, that is, when roll displacement exceeds D2, the stabilizer bar assembly with variable roll stiffness may more effectively suppress the rolling phenomenon compared to a traditional stabilizer bar.

Figure 8:
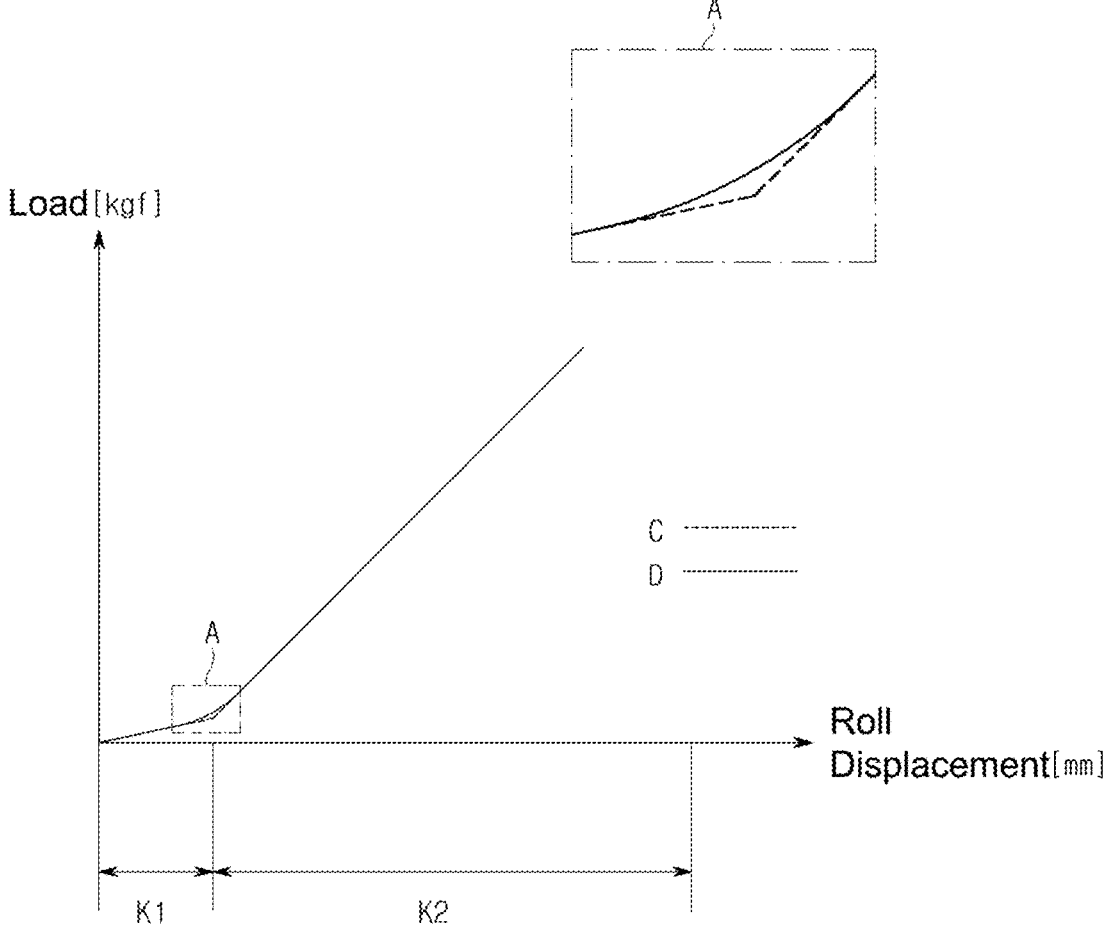
FIG. 8 is a graph comparing changes in the loads applied to a stabilizer bar assembly with variable rolling stiffness according to an embodiment of the present disclosure with or without an auxiliary elastic member based on roll displacement.

FIG. 8 is a graph comparing changes in the loads applied to a stabilizer bar assembly with variable rolling stiffness according to an embodiment of the present disclosure with or without an auxiliary elastic member based on roll displacement.

FIG. 8 shows that the assembly C provided with the elastic member alone experiences a drastic change of the load in which the first stiffness interval K1 transitions to the second stiffness interval K2 while the assembly D provided with both the elastic member and auxiliary elastic member experiences a gradual change of the load in which the transition from the first stiffness interval K1 to the second stiffness interval K2 follows a curve due to the presence of the auxiliary elastic member.

Accordingly, the sense of jolt during driving may be prevented by providing both the elastic member and the auxiliary elastic member and inducing a gradual increase of the inflection interval in which the first stiffness interval K1 transitions to the second stiffness interval K2.

Figure 9:
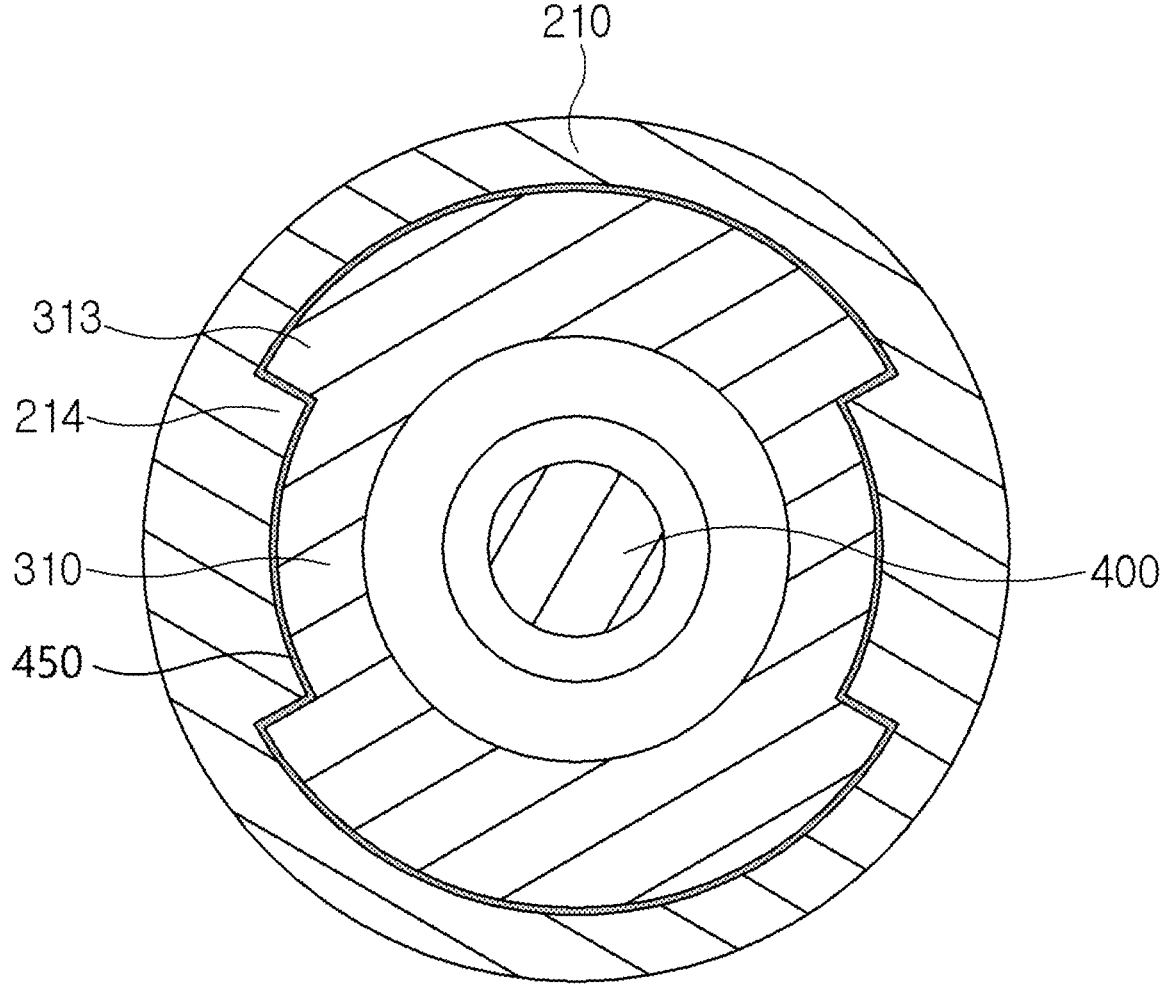
FIG. 9 is a cross-sectional view schematically illustrating a stabilizer bar assembly with variable roll stiffness according to another embodiment of the present disclosure.

FIG. 9 is a cross-sectional view illustrating a stabilizer bar assembly with variable roll stiffness according to another embodiment of the present disclosure.

FIG. 9 shows that the first support portion 214 and the second support portion 313 contact each other beyond a predetermined angular range to rotate together. In this case, the first support portion 214 and the second support portion 313 may generate a contacting sound, that is, noise while contacting each other.

To avoid this phenomenon, a buffer 450 is further included between the first support portion 214 and the second support portion 313.

Here, the buffer 450 may include at least one of lubricant, elastomer, or plastic. For example, the buffer 450 may be a viscous semi-solid form of grease.

The buffer 450 may be positioned between the first support portion 214 and the second support portion 313 and serve as a buffer ensuring that the first support portion 214 and the second support portion 313 do not come into direct contact.

Accordingly, in the present embodiment, noise may be prevented by further providing the buffer 450 and minimizing the contacting sound of the first support portion 214 and the second support portion 313

The present disclosure has been described in detail through specific embodiments, but this is intended to describe the present disclosure specifically, and the present disclosure is not limited thereto. It is clear that the present disclosure may be modified and improved upon by those skilled in the art within the scope of technical ideas of the present disclosure.

All simple modifications and changes of the present disclosure fall within the scope of the present disclosure, and the specific scope of protection of the present disclosure will be made clear by the accompanying patent claims.

The advantageous effect of the stabilizer bar assembly with variable roll stiffness of the present disclosure is that lower stiffness by the elastic force of the elastic member may act during straight driving to enhance ride comfort during straight driving and higher stiffness by the stabilizer bars may act during cornering to enhance driving stability.

According to the present disclosure, a stabilizer bar having higher stiffness than traditional stabilizer bars may be employed to have the effect of further improved driving stability during cornering.

In addition, according to the present disclosure, the effect of preventing the sense of jolt during driving may be achieved by providing an auxiliary elastic member and inducing a gradual increase of the inflection interval in which the first stiffness interval transitions to the second stiffness interval.

In addition, according to the present disclosure, a buffer may be further provided between the first support portion and the second support portion to serve as a buffer so that the contacting noise is minimized and noise is prevented.

DESCRIPTION OF REFERENCE NUMERALS

100: stabilizer bar assembly with variable roll stiffness
110: first stabilizer bar
120: second stabilizer bar
200: outer housing
210: outer housing body
211: first stabilizer bar securing portion
212: first elastic member securing portion
213: inner housing receptacle
214: first support portion
220: outer housing cover
221: second stabilizer bar insertion hole
300: inner housing
310: inner housing body
311: second stabilizer bar securing portion
312: second elastic member securing portion
313: second support portion
314: first support portion receiving groove
315: auxiliary elastic member securing groove
320: auxiliary elastic member
400: elastic member
410: one end
420: the other end
450: buffer
500: rotation support

What is claimed is:

1. A stabilizer bar assembly with variable roll stiffness comprising:

an outer housing secured to a first stabilizer bar to rotate together and having a hollow space inside;

an inner housing secured to a second stabilizer bar to rotate together and inserted into the outer housing to rotate relative thereto;

an elastic member having one end secured to the outer housing and the other end secured to the inner housing to apply an elastic force to return the outer housing and the inner housing to their original positions during relative rotation; and a first stiffness interval in which the outer housing and the inner housing do not interfere with each other within a predetermined angular range and the elastic member acts, and a second stiffness interval in which the outer housing and the inner housing constrain each other beyond a predetermined angular range and the first stabilizer bar and the second stabilizer bar act.

2. The assembly of claim 1, wherein the outer housing comprises:

an outer housing body having a hollow space with one side open and the other side secured to the first stabilizer bar;

an inner housing receptacle formed by depression on the open side of the outer housing body for the inner housing to be inserted thereinto;

a first elastic member securing portion formed by depression on an inner side of the inner housing receptacle to fixedly secure one end of the elastic member; and a first support portion formed by protrusion on an inner circumferential surface of the inner housing receptacle in an circumferential direction to selectively support the inner housing upon contact.

3. The assembly of claim 2, wherein the inner housing comprises:

an inner housing body having a hollow space with one side open and the other side secured to the second stabilizer bar;

a second elastic member securing portion formed by depression on the inner side of the inner housing body to fixedly secure the other side of the elastic member; and a second support portion formed by protrusion on an outer circumferential surface of the inner housing body in the circumferential direction to selectively support the first support portion upon contact.

4. The assembly of claim 3, wherein a plurality of first support portions and second support portions are disposed alternately, do not contact each other within a predetermined angular range, and contact each other beyond a predetermined angular range to rotate together.

5. The assembly of claim 4, wherein a buffer is further included between the first support portion and the second support portion.

6. The assembly of claim 5, wherein the buffer includes at least one of viscous lubricant, elastomer, and plastic.

7. The assembly of claim 3, further comprising an auxiliary elastic member protruding outward from a surface of the second support portion contacting the first support portion to apply an elastic force when contacting the first support portion.

8. The assembly of claim 7, wherein the elastic member applies an elastic force when the outer housing and the inner housing rotate relative to each other, the auxiliary elastic member applies an additional elastic force when the first support portion comes into contact with the auxiliary elastic member, and the first stabilizer bar and the second stabilizer bar apply further elastic force when the first support portion comes into contact with the second support portion.

* * * * *